United States Patent [19]
Young et al.

[11] Patent Number: 5,622,615
[45] Date of Patent: Apr. 22, 1997

[54] PROCESS FOR ELECTROWINNING OF COPPER MATTE

[75] Inventors: Sharon K. Young, Tucson, Ariz.; David B. Dreisinger, Delta; Jinxing Ji, Vancouver, both of Canada

[73] Assignee: The University of British Columbia, Vancouver, Canada

[21] Appl. No.: 582,772

[22] Filed: Jan. 4, 1996

[51] Int. Cl.$^6$ .................................................. C25C 1/12
[52] U.S. Cl. ........................ 205/582; 205/583; 205/584; 205/585; 205/576; 75/426; 75/429
[58] Field of Search ..................... 205/583, 584, 205/582, 585, 576; 75/416, 419, 420, 424, 426, 427, 428, 429; 423/22, 27

[56] References Cited

U.S. PATENT DOCUMENTS

| | | | |
|---|---|---|---|
| 1,553,414 | 9/1925 | Van Arsdale | 205/584 |
| 3,524,802 | 8/1970 | Clevenger | 205/584 |
| 3,767,543 | 10/1973 | Hazen | 205/582 |
| 3,776,826 | 12/1973 | Atadan | 205/582 |
| 3,853,724 | 12/1974 | Wojcik et al. | 205/574 |
| 3,923,616 | 12/1975 | Atadan et al. | 205/582 |
| 3,926,752 | 12/1975 | Loretto | 205/582 |
| 3,974,253 | 8/1976 | Snell | 423/27 |
| 4,030,989 | 6/1977 | Atmore et al. | 205/583 |
| 4,053,377 | 10/1977 | Schalin | 205/574 |
| 4,061,552 | 12/1977 | Everett et al. | 205/543 |
| 4,066,520 | 1/1978 | Emmett Jr. et al. | 205/584 |
| 4,096,053 | 6/1978 | Emmett et al. | 204/238 |
| 4,107,009 | 8/1978 | Everett et al. | 205/351 |
| 4,256,553 | 3/1981 | Baczek | 205/584 |
| 4,290,865 | 9/1981 | Baczek et al. | 205/583 |
| 4,423,011 | 12/1983 | Baglin | 423/22 |
| 4,634,467 | 1/1987 | Ochs | 423/29 |
| 4,834,842 | 5/1989 | Langner | 205/794 |
| 5,366,715 | 11/1994 | Dreisinger | 423/531 |

FOREIGN PATENT DOCUMENTS 2108480   5/1983   United Kingdom.

OTHER PUBLICATIONS

Atwood, George E., Livingston, Richard W., "The Clear Processs. A Duval Corporation Development", *Erzmetall*, 33(5), 251–255.

Balachandra, J. "Electrowinning Of Copper And Recovery Of Sulfur From Matte–Ferric Chloride Process", *J Elecrochem. Soc. India*, 27(1), 23–27.

Balachandra, J. "Direct Electrowinning And Recovery Of Copper And Elemental Sulfur From The Matte Ferric Chloride Process", *J. Electrochem. Soc. India*, 26(1), 52.

Dalton, R. F.; Diaz, G.; Hermana, E.; Price, R.; Zunkel, A. D. "The Cuprex Metal Extraction Process: Pilot Plant Experience And Economics Of A Chloride–Based Process For The Recovery Of Copper From Sulfide Ores", *Proc. Copper 91—Cobre 91 Int. Symp.*, vol. 3, 61–69.

Dalton, R. F.; Diaz, G.; Price, R.; Zunkel, A. D., "The Cuprex Metal Extraction Process: Recovering Copper From Sulfide Ores", *JOM*, 43(8), 51–56.

Everett, P. K.; Moyes, A.J., "The Intec Copper Process", *AusIMM Extractive Metallurgy Conference*, Sep. 92, 287–292.

Minto, Robert, "Electrowinning Of Copper From Copper–Iron Matte" *Diss. Abstr. Int. B 1975*, 35(7), 3351.

Venkatachalam, S., "Treatment Of Chalcopyrite Concentrates By Hydrometallurgical Techniques", *Min. Eng.* 4(7–1) 1115–1126.

Patent Joernaal, Jul. 1972, Claim 1 of South African Patent ZA 70/8164, John DeBarton Cunliff: The Recovery of Nickel and Copper from Smelter Matte.

*Primary Examiner*—Kathryn Gorgos
*Assistant Examiner*—Brendan Mee

[57] ABSTRACT

A sulfur dioxide free process for the production of high purity metallic copper from copper-matte wherein copper-matte is leached under oxidizing conditions in a ferric-containing acid copper sulfate electrolyte leach assembly including one or more leach reactors to yield a copper-rich electrolyte, and copper cathode is produced in an electrowinning assembly which is physically decoupled from the leaching assembly and may include one or more electrowinning cells. The process operates at ambient pressure and temperatures less than the boiling point.

28 Claims, 2 Drawing Sheets

PROCESS FOR ELECTROWINNING OF COPPER MATTE

FIELD OF THE INVENTION

The present invention is a process in the fields of hydrometallurgy and electrometallurgy. Specifically, it relates to a sulfur dioxide-free process for continuous production of high purity metallic copper from copper-matte in a sulfate medium by means of leaching and electrowinning methods under ambient pressure and at a temperature below the boiling point.

BACKGROUND OF THE INVENTION

At the present time, commercial copper production is predominantly based on pyrometallurgical methods involving smelting, converting, and electrorefining and to a lesser extent on hydrometallurgical methods involving leaching, solvent extraction, and electrowinning.

One of the serious problems inherent to those pyrometallurgical processes dealing with copper-bearing sulfide minerals is the production of large volumes of fugitive gases, including sulfur dioxide gas. Particularly, the converting and fire refining operations result in the release of large volumes of these gases. The amount of sulfur dioxide gas discharged into the atmosphere has been strictly regulated by both federal and local governments. Sulfur dioxide emission regulations are becoming much tougher, and the industry must either observe the regulations and incur the associated costs, incur formidable and costly penalties, or potentially face forced plant shutdowns.

In order to eliminate or minimize the emission of sulfur dioxide gas, alternative processes have been studied in the past, aimed at convening the sulfide sulfur to sulfate or to elemental sulfur. The route for conversion to sulfate is expensive and may be technically difficult. A more desirable option is to convert sulfides to elemental sulfur, due to the highly marketable value of elemental sulfur. In the past two decades, many researchers tackled this $SO_2$ problem, focusing on the conversion of sulfide to elemental sulfur. As a result of various endeavors, a number of hydrometallurgical processes were developed, such as the ELECTROSLURRY, Intec, Dextec, and CLEAR processes, in attempts to recover sulfide sulfur in its elemental form.

Envirotech's ELECTROSLURRY process, described in U.S. Pat. Nos. 4,096,053 and 4,066,520, is a sulfate based hydrometallurgical process which is capable of recovering copper from chalcopyrite concentrate, chalcocite concentrates, smelter flue dusts, and cement copper, where sulfides are rejected to the leach residue. In the Envirotech process, leaching and electrowinning are carried out simultaneously in a slurry electrolyte, and catholyte and anolyte are not separated with any kind of diaphragm. This process provides for a simple cell design, high current density electrowinning with no oxygen evolution, and all unit operations under ambient pressure and at temperature below the boiling point. However, in this process, feed materials require a pretreatment to remove any acid soluble impurities and to make the material amenable to be used as a feed for subsequent electrowinning. A substantial weakness of this process is the astoundingly high sulfur content in copper cathode due to the entrapment of sulfides and elemental sulfur.

The Intec Copper Process is a completely hydrometallurgical process using a strong sodium chloride medium where copper sulfide is leached out by cupric ion and air at atmospheric pressure and temperature below 100° C. to solubilize copper as cuprous ion into solution. At the same time, sulfides and iron are rejected into the leach residue as elemental sulfur and goethite, respectively. The leaching is followed by solution purification and high current density electrowinning in a diaphragm cell using dimpled copper sheet as a cathode substrate and $RuO_2/IrO_2$ coated titanium mesh as an anode to produce copper granules. The copper granules may require further processing to be in a form acceptable for commercial transactions (i.e. cathode, rod, wire). One of the most undesirable requirements for this process is the use of expensive ion-exchange membranes as the diaphragms for the electrowinning cells. Due to the potentially fast growth of dendrites on the cathode in a chloride electrolyte and due to the high cost and fragility of ion exchange membranes, the electrowinning cells for this process can be very complicated. In addition, leach solutions are highly air sensitive, as oxygen in the air will oxidize cuprous ions. This may result in added cost and complexity in electrowinning cell design and operation.

The Dextec Copper Process, described in U.S. Pat. No. 4,061,552, is similar to the Intec process in some respects. Both processes are chloride based, operate under atmospheric pressure and at temperatures below 100° C., and provide for high current density electrowinning to recover copper as granules or powder. However, in the Dextec Copper Process, both leaching and electrowinning take place simultaneously in a diaphragm cell, with electrolyte purification being carried out after leaching. Chalcopyrite particles are suspended in the slurry anolyte and leached out chemically and/or electrochemically to form cuprous ions, elemental sulfur and ferrous iron, which is further oxidized by oxygen and precipitated as $Fe_2O_3$. High chloride concentrations are desirable to stabilize cuprous, and a stream of air bubbles is needed to keep solid particles in suspension and to favor the precipitation of $Fe_2O_3$. The slurry anolyte is separated from the catholyte by a polypropylene filter cloth through which clear anolyte rich in cuprous transfers to the catholyte. Copper is recovered on the cathode as copper powder which is removed by the mechanical vibration of the cathode at a frequency of 5 seconds in every 15 minutes. The Dextec Copper Process suffers from a complicated electrowinning cell design and heavy loss of silver. The silver loss is generally attributed to the fact that silver dissolves readily in chloride media and then co-deposits with copper into copper cathode. Further, the Dextec process requires a continuous flow of electrolyte from anode compartment to cathode compartment in order to avoid a substantial decrease in current efficiency. The operating conditions are difficult to control, and the mass balance between the copper depletion in catholyte and copper enrichment in anolyte is difficult to maintain. The fatal problem with the copper product of this process is that it is not adequately pure and may contain unacceptable levels of silver, antimony and bismuth. The product will require further processing to be in a form and purity acceptable for commercial transactions.

Duval's CLEAR process has many common features to the more recent Intec process in that both processes are chloride medium based, both involve multistage leaching with chalcopyrite being converted to cuprous, both result in elemental sulfur and ferric hydroxide precipitation, both have diaphragmed electrowinning cells, and both produce copper granules as a final product. The CLEAR process also has the disadvantage of producing impure copper granules with high silver levels in the copper granules. Another disadvantage of the CLEAR process is the use of an autoclave for its 2nd-stage leaching under a pressure as high as ~3.5 atm and at a temperature up to 150° C.

OBJECTS OF THE INVENTION

It is an object of the present invention to provide for a simple, environmentally friendly and cost-effective hydrometallurgical process to replace the existing copper-matte convening and subsequent copper electrorefining processes normally associated with the pyrometallurgical production of copper from a copper-beating sulfide ore.

It is a further object of the present invention to provide for a hydrometallurgical process to be used in conjunction with the smelting of copper-beating sulfide ores, wherein elemental sulfur is recovered as a by-product, thus eliminating the sulfur dioxide gas production and fugitive emissions associated with matte conversion and fire refining.

Briefly, the present invention provides for a process for the production of high purity metallic copper from copper-matte comprising the steps of leaching copper-matte under oxidizing conditions to obtain a pregnant leach solution in a leaching assembly including one or more leach tanks, and electrowinning copper from the pregnant leach solution in one or more electrowinning cells which are physically decoupled from the leaching assembly.

Other objectives and advantages will become apparent upon reading the detailed description which follows.

DETAILED DESCRIPTION OF THE INVENTION

The present invention provides for a hydrometallurgical alternative to the copper-matte converting and subsequent copper electrorefining processes which traditionally follow the smelting of copper-bearing sulfide ores. This invention avoids the cost and detrimental environmental issues associated with copper-matte converting and fire refining. This invention further provides for a simpler process chemistry, simpler overall flowsheet, and a more pure product than prior art hydrometallurgical attempts.

The overall process can be divided into eight stages: 1) crushing & grinding; 2) leaching; 3) solid-liquid separation; 4) electrowinning; 5) purification of bleed stream electrolyte; 6) elemental sulfur removal; 7) recycling of incompletely reacted matte; and 8) platinum group metal (PGM) and precious metals recovery. The process is novel in several respects, particularly in the stages of leaching and electrowinning.

The feed material for the process is copper-matte (some form of Cu·Fe·S), the final product of a smelting process. For example, a high-grade copper-matte sample treated in the present process may contain over 95% chalcocite ($Cu_2S$), approximately 3.3% magnetite ($Fe_3O_4$), minor components like sulfides of iron, lead, nickel, bismuth, arsenic and antimony, etc., and a minute amount of precious metals, although other matte compositions may be used in the present invention. Normally, matte is subsequently convened to remove the sulfur and iron. However, the present invention provides for the removal of these elements without the normal converting operation.

Figure 1:
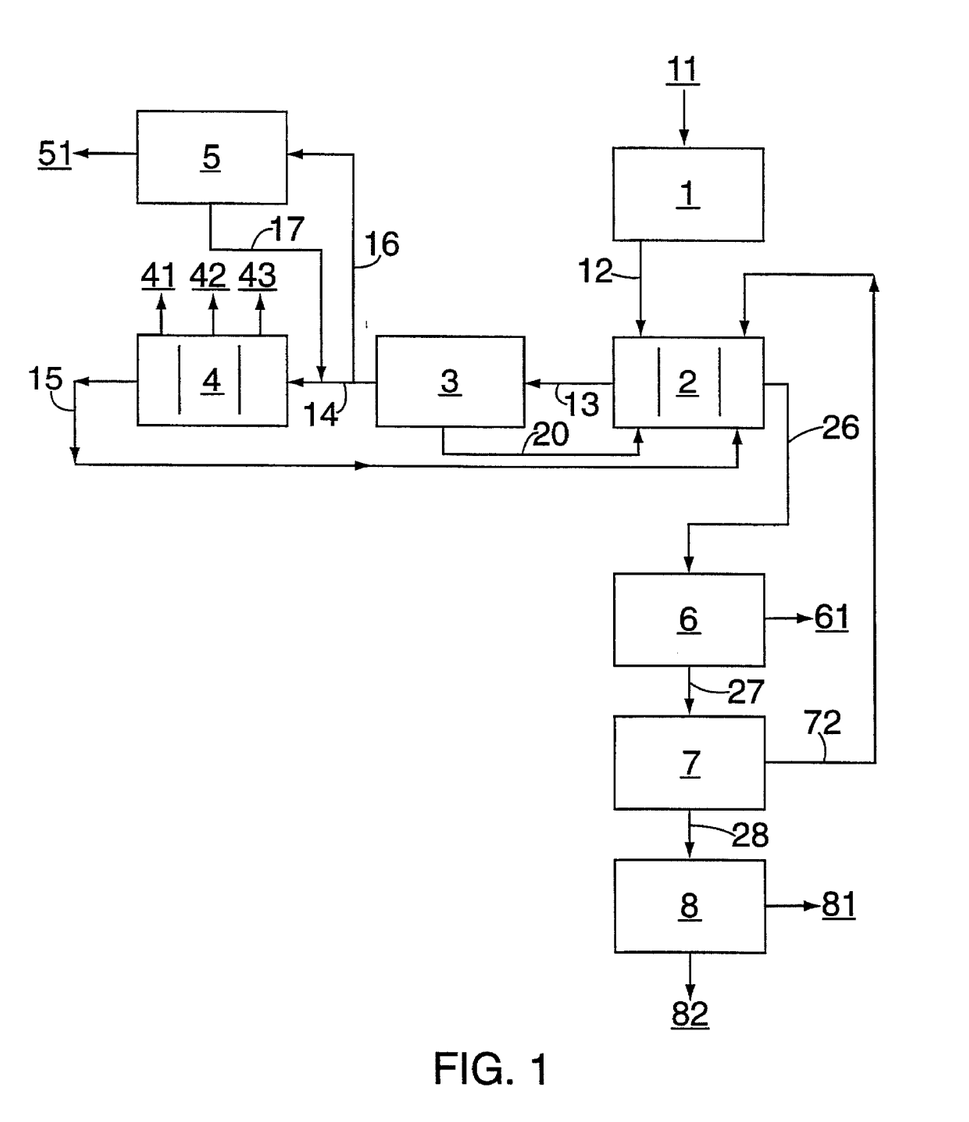
FIG. 1 is a schematic illustration of an overall process in accordance with the present invention.

With reference to the overall flowsheet as represented by FIG. 1, copper-matte is transported via line 11 to the crasher and mill 1 where copper-matte is crashed and ground to preferably 80% passing 200 mesh, more preferably 80% passing 325 mesh in particle size. A small particle size promotes a fast reaction and a high copper recovery in the subsequent leaching step.

Dry grinding of this copper-matte may be accomplished in a ball or rod mill coupled with an overhead cyclone. However, other methods may be used, such as wet grinding which avoids the generation heat and oxidation of copper sulfide which may occur during dry grinding.

After grinding, copper-matte is fed through line 12 directly to leach tank assembly 2 where $Cu_2S$ reacts with $Fe^{3+}$ to form $Cu^{2+}$ and $S°$, as represented by the reaction of $Cu_2S+4Fe^{3+}=2Cu^{2+}+4Fe^{2+}+S°$. Magnetite ($Fe_3O_4$) and PGM metals as well as gold and silver do not dissolve in leach tank assembly 2, and accordingly remain in the leach residue.

After solid-liquid separation using a thickener or any other methods known in the art, the clear pregnant leach solution is passed via line 13 to a filter 3 which removes any possible carry-over of tiny particles of incompletely reacted matte and elemental sulfur in order to ensure a clean electrolyte going via line 14 into the electrowinning cell assembly 4. The filter cake from filter 3 is returned through line 20 back to leach tank 2.

Within electrowinning cell assembly 4, cuptic ions are reduced to dense metallic copper on the cathodes which are harvested via lines 41, 42, 43, and at the same time ferrous ions are oxidized to ferric ions on anodes in cell assembly 4, without any hydrogen or oxygen evolution taking place on the cathode or anode. The regenerated ferric ions may be transferred via line 15 to the leach tank assembly 2 to dissolve more copper out of $Cu_2S$ in the copper-matte.

Though not necessary to the present invention, it is optional to withdraw via line 16 a bleed stream of electrolyte to control the buildup of impurity levels such as, As, Bi, Sb, etc., in the electrolyte. After impurities are removed from the bleed stream in the purification means 5 using a technique such as ion-exchange or solvent extraction, the purified bleed stream electrolyte is returned via lines 17 and 14 back to the electrowinning assembly 4. Removed impurities are disposed via line 51. A bleed stream may be withdrawn at another point in the process, without departing from the present invention. The purified bleed stream optionally may be returned to the process.

The leach residue generated in the leach tank assembly 2 is discharged through line 26 into the unit 6 for the removal of elemental sulfur. Elemental sulfur can be recovered using a process such as hot melting and filtration, or $NH_3$—$H_2S$ leaching, etc. Line 61 carries recovered elemental sulfur which can be sold as a commercial product or can be converted to $SO_2$ or sulfuric acid.

The remaining residue is carried further via line 27 over to the unit 7 for the recovery of incompletely reacted copper-matte. This incompletely reacted copper-matte has undergone partial decomposition and is largely in the form of covellite (CuS) which can be recycled via line 72 to the leach tank assembly 2.

The residue from unit 7 contains all originally present PGM metals, gold, silver, insoluble impurities like magnetite ($Fe_3O_4$), and gangue. This residue is fed via line 28 to the unit 8 for the recovery of precious metals. Recovered precious metals are discharged via line 81 for further separation, if necessary, or for sale as an impure admixture. The residue via line 82, after precious metal recovery, is mainly composed of unwanted materials and can be disposed.

The leach tank assembly 2 of the present invention may be constructed such that the leaching takes place either in one or in multiple stages in the process. In either event, leaching takes place under ambient pressure and at temperatures below the boiling point. Through the leaching, $Cu^{2+}$ ions are liberated from $Cu_2S$ by the chemical attack of $Fe^{3+}$ as expressed by the reaction $Cu_2S+4Fe^{3+}=2Cu^{2+}+S^0+4Fe^{2+}$. However, the actual leach mechanism of copper-matte is stepwise. Depending on the oxidizing condition and especially the concentration of ferric ions or redox potential of the leach slurry, the leaching of copper-matte may go to completion or may prematurely stop with the formation of intermediate products. For example, the leaching may result in digenite ($Cu_{1.8}S$) and covellite (CuS) intermediates if the driving force is not large enough. It is believed that the decomposition of copper-matte is accomplished via three steps as follows: (1) $5Cu_2S+2Fe^{3+} \rightarrow 5Cu_{1.8}S+Cu^{2+}+2Fe^{2+}$; (2) $5Cu_{1.8}S+8Fe^{3+} \rightarrow 5CuS+4Cu^{2+}+8Fe^{2+}$; and (3) $5CuS+10Fe^{3+} \rightarrow 5Cu^{2+}+5S^0+10Fe^{2+}$. The first decomposition step of $Cu_2S \rightarrow Cu_{1.8}S$ has the least resistance and can proceed very easily, even at a ferric concentration less than 0.3 g/l. The second decomposition step of $Cu_{1.8}S \rightarrow CuS$ also has little resistance and can proceed readily at a ferric concentration on the order of 0.3 g/l. The third decomposition step, $CuS \rightarrow Cu^{2+}$, is the most difficult and it will likely not take place at acceptable rates unless the ferric concentration is greater than 3 g/l.

In the leaching step of the present invention, preferably only copper is dissolved in the form of $Cu^{2+}$ into solution, and elemental sulfur, PGM metals gold and silver are left over in the leach residue. The further oxidation of elemental sulfur to sulfate is negligible in this system because the leaching slurry is highly acidic and is only mildly oxidizing. Due to the weak oxidizing power of ferric iron and the absence of any complexing agents, PGM metals, gold and silver are not dissolved at all during copper leaching.

Figure 2:
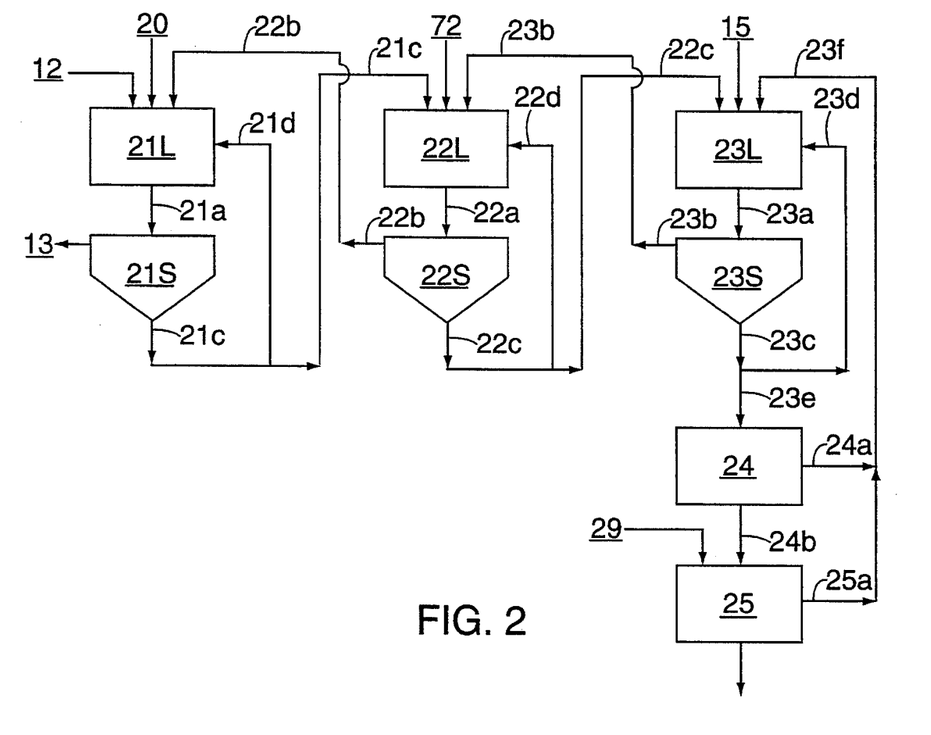
FIG. 2 is a schematic illustration of a multistage leaching operation in a preferred embodiment of the present invention.

Because of the unique mechanism of copper-matte decomposition, it is preferable to have multistage counter current flow leaching. Multiple stage leaching, and preferably three-stage leaching is preferred to promote a high copper leaching extraction. A preferred embodiment for the present invention is conducted as a continuous process employing a three-stage leach assembly as shown in FIG. 2. In this preferred embodiment, finely ground copper-matte undergoes three-stage leaching under ambient pressure and at a temperature below the boiling point. Copper-matte is leached in three leach tanks 21L, 22L and 23L via counter current flow. In the case of three-stage leaching, it is believed that reactions (1) and (2) outlined above take place in the 1st-stage leach tank 21L, reactions (2) and (3) take place in the 2nd-stage leach tank 22L, and only reaction (3) takes place in the 3rd-stage leach tank 23L. Ferric concentration is highest in the 3rd-stage leach tank 23L and lowest in the 1st-stage leach tank 21L.

With reference to FIG. 2, the overall three-stage leaching assembly includes the following components, inputs, and outputs. Finely ground fresh copper-matte is added to the leaching assembly via line 12 to the 1st-stage leach tank 21L. Incompletely reacted copper matte from the overall process is added to the leaching assembly via line 72 to the second stage leach tank 22L. Regenerated ferric ions from the electrowinning cells are input into the leaching assembly being fed via line 15 to the 3rd-stage leach tank 23L. Solid-liquid separation means, such as thickeners, 21S, 22S, and 23S separate out an overflow and an underflow from each of the leach tanks in the leaching assembly. Line 13, represents the clear pregnant leach solution output from the leaching assembly to the electrowinning cells.

Theoretically, in accordance with the overall leaching reaction ($Cu_2S+4Fe^{3+}=2Cu^{2+}+4Fe^{2+}+S^0$), one mole of ferric produces only one half mole of cupric. Therefore, from the viewpoint of leaching alone, high ferric concentration in the input stream 15 to the 3rd-stage leach tank 23L is desirable, since it will increase the leaching rate of copper-matte and reduce the amounts of slurries and clear solutions to be handled within the leaching circuit itself and the amounts of input stream via line 15 to the 3rd-stage leach tank 23L and output stream via line 13 from the 1st-stage thickener 21S. However, because electrowinning performance varies inversely with the ferric concentration in the electrolyte, ferric concentration in the input stream via line 15 is determined entirely by electrowinning performance. Ferric concentrations in the electrolyte lower than 10 g/l are preferable to achieve a reasonably high current efficiency.

To facilitate the leaching reactions above, the copper-matte particles are preferably 200 mesh, more preferably 325 mesh and should be well suspended in the leaching solution, possibly using mechanical agitation, recirculation or inert gas sparging. With reference to FIG. 2, in the first-stage leach tank 21L, finely ground fresh copper-matte, which is fed via line 12, and a small amount of filter cake containing incompletely reacted copper-matte, which is added via line 20, are mixed with part of the underflow stream via lines 21c and 21d from the 1st-stage thickener 21S and the overflow stream via line 22b from the 2nd-stage thickener 22S. The fresh copper-matte feeding rate via line 12 is calculated according to the copper plating rate on the cathode in the electrowinning cells and the overall copper extraction percentage during leaching. The copper plating rate should equal the total copper leaching rate. The return of part of the underflow stream via lines 21c and 21d from the 1st-stage thickener 21S back to the 1st-stage leach tank 21L is preferable, as each pass of ferric bearing solution across the leach tank leaches only a small amount of copper from copper-matte. Each pass results in a small increase in $Cu^{2+}$ concentration in solution on the order of 1 to 5 g/l, which is dependent upon the ferric concentration in the input solution via line 15. The residence time for the solid phase depends on the copper plating rate, pulp density, the copper content in the original copper-matte, required copper recovery, the size of leach reactor for each stage, and the number of leach stages.

The residence time for the liquid phase depends on the copper plating rate, the redox potential of electrolyte in the electrowinning cell, the redox potential of slurry in the 1st-stage leach reactor, the size of leach reactor for each stage, and the number of leaching stages.

The discharge slurry via line 21a from the 1st-stage leach tank 21L to the first-stage thickener 21S contains mainly CuS, $Cu_{1.8}S$ (in a small quantity), $FeSO_4$, $Fe_2(SO_4)_3$(<0.3 g/l $Fe^{3+}$), $CuSO_4$, $H_2SO_4$ and small amounts of additives and impurities. Minimal elemental sulfur is formed in the 1st-stage leach tank 21L. Pulp density may range from 5 to 70%. Pulp density is preferably about 40% for each stage. The recycling process of the present invention ensures that leaching may be carried out at a high pulp density while minimizing the size of the leaching tanks necessary. The overflow stream via line 13 from the 1st-stage thickener 21S contains $CuSO_4$ (20 to 50 g/l $Cu^{2+}$), $H_2SO_4$ (20 to 200 g/l), $FeSO_4$ (20 to 50 g/l $Fe^{2+}$), $Fe_2(SO_4)_3$ ($\leq 0.3$ g/l $Fe^{3+}$), small amounts of additives and trace amounts of impurities. Before this pregnant solution is pumped to the electrowinning cells, an extra filtration may be preferable to remove any carry-over of tiny solid particles, in particular, elemental sulfur. After filtration, this pregnant solution is introduced to the electrowinning cells.

The underflow stream from line 21c from the 1st-stage thickener 21S should contain as little solution as possible. Otherwise, the leach solution contained in the underflow, lean in $Fe^{3+}$, is transferred in an undesirable direction to the next stage of leaching, thus slowing down the leaching rate and affecting the completeness of the copper-matte decomposition. The underflow stream is further divided into two sub-streams via lines 21d and 21e. The sub-stream via line 21e should carry an amount of solids as required to optimize leaching by maintaining specified apparent pulp density in the leach tank 21L. The sub-stream via line 21e accounts for only a small portion of underflow stream from line 21c from 1st-stage thickener 21S. A large portion of underflow stream is recycled internally via line 21d back to leach tank 21L.

The 2nd-stage leaching is fairly similar to the 1st-stage leaching. The temperature and apparent pulp density in the 2nd-stage leach tank 22L are similar to those in the 1st-stage leach tank 21L. However, in the 2nd-stage leach tank 22L, ferric content is on the order of 3–4 g/l, which is more than 10 times higher than that in the 1st-stage leach tank 21L. The $Cu_2S$ in copper-matte has been converted to $Cu^{2+}$, covellite (CuS) and some elemental sulfur as well. The content of elemental sulfur in the solid phase may reach as high as 30 to 60% in the 2nd-stage leach tank. Also, it is preferable that the 2nd-stage leach tank, rather than the 1st-stage leach tank, receives via line 72 the recovered incompletely reacted copper-matte, which is mainly in the form of covellite (CuS). As the ferric concentration is higher in the 2nd-stage leach tank compared to the 1st-stage leach tank, decomposition of covellite to $Cu^{2+}$ can take place at an acceptable rate in the 2nd-stage leach tank.

The slurry in the 2nd-stage leach tank 22L is discharged via line 22a to the 2nd-stage thickener 22S. As with the 1st-stage thickener 21S, the underflow stream via line 22c from the 2nd-stage thickener 22S should contain as little solution as possible. The underflow stream via line 22c is divided into sub-streams via lines 22d and 22e. The sub-stream via line 22e accounts for a small portion of the underflow stream from line 22c, and should match equivalently the sub-stream via line 21e. Thus, no solids are built up in the system. The overflow stream from the 2nd-stage thickener 22S goes to the 1st-stage leach tank 21L, as the ferric concentration in this solution is still too high to be returned to the electrowinning cell.

The 3rd-stage leaching is similar to the 1st-stage and 2nd-stage leaching in some respects. However, spent electrolyte from the electrowinning cells is added to the 3rd-stage leach tank 23L via line 15. The slurry discharged via line 23a from the 3rd-stage leach tank 23L contains more than 75% by weight of elemental sulfur in the solid phase, and the overall copper extraction reaches over 95%. The temperature in the 3rd-stage leach tank 23L is similar to those in 1st-stage and 2nd-stage leach tanks 21L and 22L; however, the ferric content in leach tank 23L is the highest among leach tanks 21L, 22L and 23L, ranging from 4 to 10 g/l.

The underflow stream via line 23c from the 3rd-stage thickener 23S is also divided into two sub-streams via lines 23d and 23e. Sub-stream via line 23e is forwarded further to the filter 24 for removal of excessive solution contained in the underflow. The recovered solution in the filter 24 is returned via lines 24a and 23f back to the 3rd-stage leach tank 23L. The obtained filter cake in filter 24 is sent via line 24b to a washing means 25. Two or three displacement washings may be adequate to release the solution entrapped inside the filter cake. In practice, filter 24 and washing means 25 can be combined into a single process unit. To prevent the precipitation of ferric hydroxide, washing water added via line 29 is preferably slightly acidic. Part of the wash solution from the washing means 25 can be added to the 3rd-stage leach tank 23L via lines 25a and 23f. Alternatively, washing solution from line 25a can be added evenly to 1st-, 2nd- and 3rd-stage leach tanks 21L, 22L and 23L. Acid is introduced to compensate for the loss of acid which may occur when the electrowinning cells, leach tanks and thickeners are exposed to the open air. A certain amount of acid will be lost due to oxygen absorption followed by its reaction with ferrous or copper-matte. However, only a small quantity of acid is preferably added via line 29 so as not to disturb significantly the acid balance in the overall process. Because water loss can occur through evaporation if the electrowinning cells, leach tanks and thickeners are not sealed, the water introduced via line 29 should be added so as not to disturb the water balance of the whole system either. The filter cake obtained after washing and dewatering in 25 is forwarded to sulfur removal means 6 (in FIG. 1).

Solid-liquid separation in 21S, 22S, and 23S can be realized by using commercially available equipment like a thickener or cyclone, etc. The separation of solid and liquid in counter current leaching should be efficient; otherwise, solids will be carried over via line 23b from the 3rd-stage thickener 23S to the 2nd-stage leach tank 22L, and via line 22b from the 2nd-stage thickener 22S to the 1st-stage leach tank 21L. This movement of solid phase is undesirable because, in the extreme case, all solids would end up in the 1st-stage leaching circuit. Optionally, a filter or centrifuge may be installed between each leach stage to guarantee the flow of solid phase in the correct direction. To facilitate the settlement of solid phase in the thickeners 21S, 22S and 23S, a small amount of flocculent may be added to the thickeners.

The pulp density of slurry in the leach tanks can vary in the range from 5 to 70% (w/v), preferably at 40% (w/v). The pulp density is determined partly by the leaching rate, and partly by the efficiency of the solid-liquid separation means. The leaching rate is preferably fast enough to reduce the ferric content in the input stream coming from line 15 all the way down to almost zero in the output stream going out of the line 13.

A desirable leaching rate is achieved with temperatures in the range from 60° C. to the boiling point, and 80° C. is preferable. The presence of a small amount of chloride in leaching slurries is also quite beneficial for the leaching rate. The amount of chloride addition may be in the range from 0 to 200 ppm, preferably at 75 ppm, which is again restricted by the electrowinning performance. However, the present process will work even at much higher chloride concentrations.

In the present invention, electrowinning may be carried out in one or more electrowinning cells. Multiple cells may be used in parallel or in series. Where solution is recirculated, multi-cell electrowinning promotes a higher overall current efficiency, which is defined as the average current efficiency calculated on the basis of the current efficiencies and the weights of the copper cathodes in each electrowinning cell.

Figure 3:
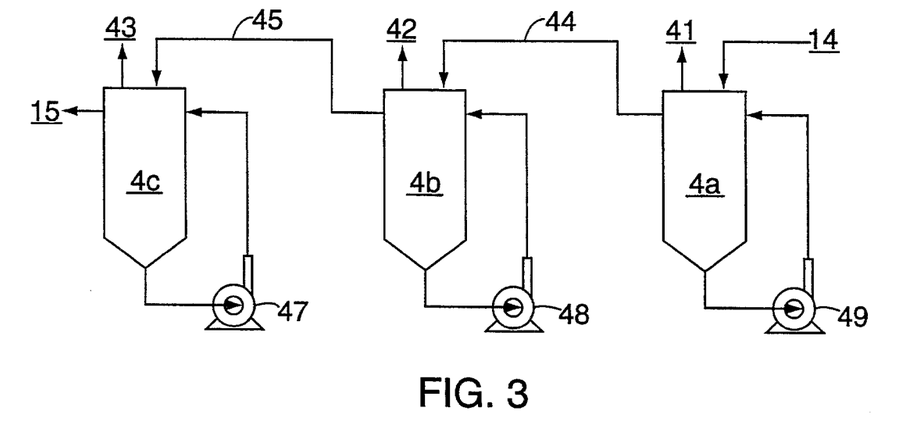
FIG. 3 is a schematic illustration of a multi-cell electrowinning operation in a preferred embodiment of the present invention.

FIG. 3 represents 3-cell series electrowinning which can be used in the present invention. The polished or clarified pregnant leach solution, which contains no solid particles and a negligible amount of ferric ions, is fed via line 14 as the feed for the 1st-stage electrowinning cell 4a. The overflow electrolyte from the 1st-stage electrowinning cell 4a is used as the feed for the 2nd-stage electrowinning cell 4b, i.e., this overflow electrolyte is transferred via line 44 and added to the 2nd-stage electrowinning cell 4b. Similarly, the overflow electrolyte from 2nd-stage electrowinning cell 4b is used as the feed for the 3rd-stage electrowinning cell 4c via line 45.

The designs of the multiple electrowinning cells 4a, 4b and 4c may be exactly the same; however, they are operated at different conditions, mainly differing in the selection of current density and electrolyte recirculation rate.

With reference to FIGS. 1, 2, and 3, the overflow electrolyte from the 3rd-stage electrowinning cell 4c, relatively high in ferric ion concentration in the range from 3 to 10 g/l, may be returned via line 15 back to the 3rd-stage leach tank 23L in the three-stage leaching circuit.

Copper cathodes are harvested via lines 41, 42, and 43, respectively, from the electrowinning cells 4a, 4b, and 4c. Although the visual appearances of the copper cathodes produced in electrowinning cells 4a, 4b and 4c may vary to a certain extent, their chemical compositions remain consistently in the same range with one another. The purity of the cathodes produced in this process meet ASTM Standard B115-93 Grade 1 specifications.

In each electrowinning cell, multiple cathodes and anodes are preferably used with a spacing between an anode and its adjacent cathode on the order from 0.5" to 2", preferably 2" from center to center. A suitable cathode substrate is titanium or type 316 stainless steel, and a suitable anode material is Eltech's Activated Lead Electrode (ALE) anode or precious metal oxide (like $RhO_2/IrO_2$) coated titanium anode also known as a Dimensionally Stable Anode (DSA). The lead and lead-alloy anodes used in conventional copper electrowinning, such as, Pb-Cu-Sn-Ca, Pb-Ag and Pb-Sb-As, will also work; however, these lead anodes give a higher overpotential for ferrous oxidation.

The desirable cathode reaction is the reduction of cupric ion to metallic copper ($Cu^{2+}+2e=Cu$). Hydrogen gas does not evolve on the cathode in the present invention; however, the reduction of ferric to ferrous is thermodynamically favorable, and thus always takes place on the cathode together with the reduction of cupric ions. This side reaction of $Fe^{3+} \rightarrow Fe^{2+}$ on the cathode forces copper electrowinning to be run at a high current density in order to obtain a reasonably high current efficiency. This is because the percentage of current consumed by the reduction of ferric goes down at a high current density, ferric reduction on the cathode being controlled by the mass transfer of $Fe^{3+}$ towards the cathode surface. This is preferable, as operating and capital costs decline at a high productivity.

With respect to the cathode reaction, the preferred deposit should be a smooth coherent copper cathode rather than a rough, or dendritic cathode or granule. It has been found experimentally that to achieve coherent copper cathode, additives (such as glue, thiourea, chloride, etc.) are beneficial. Additionally, cathode current density should be below the limiting current density of cupric reduction on the cathode.

The chemical etching of deposited copper on the cathode by ferric ion in electrolyte may take place in the present invention. This chemical etching by ferric ion, if mild, is useful on one hand in eliminating the formation of any dendrites or protrusions on the cathode surface and thus having a smoothing effect, but on the other hand, if this etching is too strong, excessive amounts of deposited copper will be dissolved into the electrolyte resulting in a considerable loss of current efficiency. As the redox potential is related directly to ferric concentration, ferric concentration in the electrolyte can be controlled on-line by monitoring the redox potential of the electrolyte. A proper ferric concentration must be selected so as to optimize the leaching of copper out of copper matte while still allowing the production of a smooth, coherent cathode with minimized etching.

The desirable anode reaction is the oxidation of ferrous to ferric ($Fe^{2+}=Fe^{3+}+e$). As the anode carries positive charges, $Fe^{2+}$ ions are repelled from the anode surface due to repulsive nature between the positive charges. Therefore, ionic migration of $Fe^{2+}$ ions makes a negative contribution to the total mass transfer of $Fe^{2+}$ towards the anode surface. In such a circumstance, mass transfer of $Fe^{2+}$ ions relies both on diffusion and on convection. $Fe^{2+}$ ions must be available at the anode surface to avoid the competing anode reaction, i.e., oxygen evolution. Anode overpotential for the oxidation of ferrous to ferric should be minimized.

Oxygen evolution on the anode is preferably minimized or prevented in the present invention, as any gas evolution in the electrowinning cells will cause the formation of acid mist and correspondingly deteriorate the environment of a tankhouse. Furthermore, when oxygen gas evolves, due to its slow reaction with ferrous ($4Fe^{2+}+O_2+4H+=4Fe^{3+}+2H_2O$) in the electrolyte, generated acid due to oxygen evolution ($2H_2O=O_2+4H^++4e$) the oxygen is not fully consumed and $Fe^{3+}$ ions are not regenerated equivalently to the amount of copper plated on the cathode in the passage of oxygen gas from anode surface to the open air. Thus, when this occurs, the majority of evolved oxygen gas on the anode simply escapes to the open air. Consequently, $Cu^{2+}$ ions will be depleted and acid will build up in the electrolyte.

To prevent oxygen evolution at the anode and to provide for a coherent cathode deposit electrowon at high current efficiency, it is preferable to maintain a high recirculation rate. The upper limit of recirculation rate is determined partially by the excessive loss of current efficiency due to $Fe^{3+}$ reduction and its etching of copper cathode, and partially by the associated high pumping cost. In one preferred embodiment of the present invention as shown in FIG. 3, recirculation of the electrolyte is provided by pumps 47, 48 and 49 with a high volume flowrate and low head. To reduce the pumping cost, electrowinning cells may be constructed taller if the electrolyte must travel vertically or may be constructed longer if the electrolyte must travel horizontally.

Preferable operating conditions for 3-cell electrowinning as depicted in FIG. 3 are current density from 500 to 1,500 A/m², temperature from 60° to 90° C. (although up to the boiling point is also acceptable), $Fe^{3+}$ concentration from 1 to 10 g/l, $Fe^{2+}$ concentration from 20 to 50 g/l, $Cu^{2+}$ concentration from 20 to 50 g/l, $H_2SO_4$ concentration from 0 to 200 g/l, chloride concentration from 20 to 200 ppm, and recirculation linear velocity of electrolyte past the electrode of from 2 to 30 cm/sec, with the additions of certain additives, such as glue and thiourea, etc. At 1,000 A/m² current density, approximately ¼" thick copper cathodes can be produced over a period of 2 days.

Throughout the system, the electrolyte should be sufficiently acidic to prevent any precipitation of ferric hydroxide. High acid also reduces the voltage drop in the electrolyte in the electrowinning cells. It is presently believed that the upper limit is determined by the saturation of the electrolyte. A small quantity of chloride in the electrolyte improves the quality of copper cathode, current efficiency and copper extraction during leaching. If type 316 stainless steel is used as a cathode substrate, pitting may occur at a high chloride concentration. Glue, thiourea, guar or other additives may be added in an adequate quantity to ensure a smooth copper cathode.

In 3-cell electrowinning such as that depicted in FIG. 3, the redox potential, or ferric concentration, is lowest in the 1st-stage electrowinning cell 4a, and highest in the 3rd-stage electrowinning cell 4c. The current efficiency of copper shows the opposite, i.e, is highest in the 1st-stage electrowinning cell 4a and lowest in the 3rd-stage electrowinning cell 4c. If the electrolyte passes through electrowinning cells 4a, 4b and 4c in series, varying inversely with ferric concentration, i.e., via lines 14, 44, 45 and 15 in FIG. 3, and no bleed streams of electrolyte are made between them, only one electrowinning cell's redox potential of the electrolyte can be effectively controlled by changing the input stream via line 14. Preferably, the redox potential or ferric concentration in the 3rd-stage electrowinning cell 4c needs to be controlled. In view of the electrowinning alone, lower redox potential or low ferric concentration is preferred. However, as the overflow stream from the 3rd-stage electrowinning cell 4c back to the leaching circuit, the ferric concentration should be high enough to fully leach copper-matte into $Cu^{2+}$ ions and elemental sulfur. Due to this contradictory nature for ferric concentration, a compromised selection of ferric concentration should be maintained.

A one-stage electrowinning operation is also possible in the present invention. In a one stage electrowinning operation, it is desirable to have a single long horizontal electrowinning cell with multiple electrodes in parallel strung out along the length of the cell. The $Fe^{3+}$ increases from about 0.3 g/l to approximately 9 g/l along the length of the cell. Thus, the $Fe^{3+}$ concentration varies continuously over the length of the cell as will the current efficiency.

The various aspects of the present invention can be illustrated through the following examples:

EXAMPLE 1

Effect of Chloride and Thiourea

Mode: Batchwise 1-stage leaching and 1-stage electrowinning

Electrolyte: 35 g/L $Cu^{2+}$, 35 g/L $Fe_{(total)}$, 110 g/L $H_2SO_4$, $Cl^-$, glue and/or thiourea Conditions: 80° C., redox potential=0.425 volt vs. SCE; 6 hour duration; 100 grams of high-grade copper-matte (−325 mesh) for each test; glue added at 5.5 lb/tonne started with 16 ppm; EW Electrolyte circulation at 7 GPM (7.9 cm/sec) 970 A/m² c.d. for cathode and anode; electrode dimensions: 2"×4"; ⅛" thick titanium cathode substrate (1/16" recessed); 3/16" thick Pb-Sn-Ca-Cu anodes; 1" space center to center between anode and cathode.

| Test ID | Cl⁻ (ppm) | Thiourea initial ppm/lb per tonne | Avg. $V_{cell}$ (volt) | CE (%) | EC (kwh/kg-Cu) | Cathode |
|---|---|---|---|---|---|---|
| #89 | 125 | 0 | 1.95 | 80.6 | 2.0 | smooth |
| #90 | 125 | 1.6/0.37 | 2.00 | 82.0 | 2.1 | smooth |
| #73 | 100 | 0 | 1.88 | 79.5 | 2.0 | smooth |
| #76 | 100 | 1.6/0.37 | 1.95 | 79.7 | 2.1 | smooth |
| #79 | 75 | 0 | 1.91 | 77.9 | 2.1 | smooth |
| #80 | 75 | 1.6/0.37 | 1.98 | 79.9 | 2.1 | smooth |
| #81 | 50 | 0 | 1.91 | 66.7 | 2.4 | quite rough |
| #82 | 50 | 1.6/0.37 | 1.99 | 79.7 | 2.1 | smooth |
| #83 | 25 | 0 | 1.94 | 57.2 | 2.9 | very rough |
| #84 | 25 | 1.6/0.37 | 2.00 | 72.3 | 2.3 | smooth in center, tiny nodules near edges |
| #85 | 0 | 0 | 1.85 | 75.8 | 2.1 | smooth |
| #86 | 0 | 1.6/0.37 | 1.90 | 62.2 | 2.6 | extremely rough |

Findings:

1. With the joint addition of thiourea together with glue, the cell voltage increases by approximately 50 to 80 mV
2. When Cl⁻ concentration is equal to or above 75 ppm, whether thiourea is added or not jointly with glue will not affect the current efficiency and the quality of copper cathodes.
3. However, when Cl⁻ concentration is in the range from 25 to 50 ppm, the joint addition of thiourea together with glue is beneficial.
4. With zero Cl⁻ concentration in the electrolyte, the joint addition of thiourea together with glue is undesirable.

EXAMPLE 2

Effect of Current Density

Mode: Batchwise 1-stage leaching-and 1-stage electrowinning

Electrolyte: 35 g/L $Cu^{2+}$, 35 g/L $Fe_C$total), 110 g/L $H_2SO_4$, 75 ppm Cl⁻, glue and/or thiourea Conditions: 80° C.; redox potential=0.425 volt vs. SCE; 6 hour duration; high-grade copper-matte (−325 mesh); and for each test 100 grams for 1,000 A/m² and 150 grams for 1,500 A/m²; glue added at 5.5 lb/tonne started with 16 ppm; thiourea added at 0.37 lb/tonne started with 1.6 ppm; EW electrolyte circulation at 7 GPM (7.9 cm/sec); electrode dimension: 2"×4"; ⅛" thick titanium cathode substrate (1/16" recessed); 3/16" thick Pb-Sn-Ca-Cu anodes; 1" space center to center between anode and cathode.

| Test ID | C.D. (A/m²) | Avg. $V_{cell}$ (volt) | CE (%) | EC (kwh/kg-Cu) | Cathode |
|---|---|---|---|---|---|
| #102 | 1,000 | 1.93 | 80.9 | 2.0 | smooth |
| #97 | 1,500 | 2.34 | 86.6 | 2.3 | smooth, a few tiny nodules near edges |

Findings:

1. Both the cell voltage and the current efficiency increases with increasing density.

EXAMPLE 3

Effect of Redox Potential of Electrowinning Electrolyte

Mode: Batchwise 1-stage leaching and 1-stage electrowinning

Electrolyte: 35 g/L $Cu^{2+}$, 35 g/L $Fe_{(total)}$, 110 g/L $H_2SO_4$, 100 ppm $Cl^-$, glue and/or thiourea Conditions: 80° C.; redox potential=0.425 volt vs. SCE; high-grade copper-matte (−325 mesh); thiourea added at 0.37 lb/tonne started with 1.6 ppm; EW electrolyte circulation at 7 GPM (7.9 cm/sec); 970 $A/m^2$ c.d. for cathode and 1,720 $A/m^2$ for anode; electrode dimension: 2"×4"; 1/8" thick titanium cathode substrate (1/16" recessed); 3/16" thick Pb-Sn-Ca-Cu anodes; 1" space center to center between anode and cathode.

| Test ID | Redox Potential vs. SCE (volt) | Glue initial ppm/lb per tonne | EW time (hr.) | Avg. $V_{cell}$ (volt) | CE (%) | EC (kwh/ kg-Cu) |
| --- | --- | --- | --- | --- | --- | --- |
| #62 | 0.395 | 16/11.1 | 12 | 2.12 | 89.9 | 2.1 |
| #63 | 0.405 | 16/22.2 | 12 | 2.20 | 88.0 | 2.1 |
| #65 | 0.415 | 16/22.2 | 6 | 2.26 | 84.7 | 2.2 |
| #66 | 0.425 | 16/22.2 | 6 | 2.21 | 80.7 | 2.3 |

Findings:
1. The current efficiency decreases with increasing redox potential of electrowinning electrolyte due to more ferric ions being reduced on the cathode.

EXAMPLE 4

Effect of Temperature

Mode: Batchwise 1-stage leaching and 1-stage electrowinning

Electrolyte: 35 g/L $Cu^{2+}$, 35 g/L $Fe_{(total)}$, 5.5 g/L, $Fe^{3+}$, 110 g/L $H_2SO_4$, 75 ppm $Cl^-$, glue and/or thiourea Conditions: 6 hour duration; 100 grams of high-grade copper-matte (−325 mesh) for each test; glue added at 5.5 lb/tonne started with 16 ppm; thiourea added at 0.37 lb/tonne started with 1.6 ppm; EW electrolyte circulation at 7 GPM (7.9 cm/sec); 970 $A/m^2$ c.d. for cathode and anode; electrode dimension: 2"×4"; 1/8" thick titanium cathode substrate (1/16" recessed); 3/16" thick Pb-Sn-Ca-Cu anodes; 1" space center to center between anode and cathode.

| Test ID | Temp. (°C.) | Redox vs. SCE (volt) | Avg. $V_{cell}$ (volt) | CE (%) | EC (kwh/ kg-Cu) | Cathode |
| --- | --- | --- | --- | --- | --- | --- |
| #102 | 80 | 0.425 | 1.93 | 80.9 | 2.0 | smooth |
| #100 | 70 | 0.421 | 2.04 | 82.5 | 2.1 | smooth, only a few nodules near edges |
| #101 | 60 | 0.413 | 2.28 | 77.8 | 2.5 | smooth, quite a few nodules near edges |

Findings:
1. Between 60° and 80° C., the temperature has a little effect on the current efficiency. However, it strongly affects the surface of cathodes.
2. Cell voltage and energy consumption always increase with decreasing temperature.

EXAMPLE 5

Effect of Impurities

Mode: Batchwise 1-stage leaching and 1-stage electrowinning

Electrolyte: 35 g/L $Cu^{2+}$, 35 g/L $Fe_{(total)}$, 110 g/L $H_2SO_4$, 75 ppm $Cl^-$, glue and/or thiourea Conditions: 80° C.; redox potential=0.425 volt vs. SCE; 6 hour duration; 120 grams of high-grade copper-matte (−325 mesh) for each test; glue added at 5.5 lb/tonne started with 17 ppm; thiourea added at 0.37 lb/tonne started with 1.7 ppm; EW electrolyte circulation at 6 GPM (7.1 cm/sec); 970 $A/m^2$ c.d. for cathode and anode; electrode dimension: 2"×4"; 1/8" thick type 316 stainless steel (1/16" recessed); 1/4" thick Eltech ALE anode; 1" space center to center between anode and cathode.

| Test ID | Impurities in electrolyte | Avg. $V_{cell}$ (volt) | CE (%) | EC (kwh/kg-Cu) | Cathode |
| --- | --- | --- | --- | --- | --- |
| #142 | 50 ppm $Bi^{3+}$ | 1.09 | 83.4 | 1.1 | smooth |
| #143 | 100 ppm $Bi^{3+}$ | 1.05 | 82.7 | 1.1 | smooth |
| #144 | 150 ppm $Bi^{3+}$ | 1.07 | 83.3 | 1.1 | smooth |
| #149 | 50 ppm $Sb^{3+}$ | 1.09 | 81.6 | 1.1 | smooth |
| #150 | 100 ppm $Sb^{3+}$ | 1.10 | 84.1 | 1.1 | smooth |
| #151 | 150 ppm $Sb^{3+}$ | 1.06 | 84.5 | 1.1 | smooth |
| #146 | 500 ppm $As^{3+}$ | 1.08 | 83.4 | 1.1 | smooth |
| #147 | 1,000 ppm $As^{3+}$ | 1.07 | 82.9 | 1.1 | smooth |
| #148 | 1,500 ppm $As^{3+}$ | 1.07 | 81.9 | 1.1 | smooth |
| #152 | 100 ppm $Bi^{3+}$, 100 pm $Sb^{3+}$, 1,083 ppm $As^{3+}$ | 1.16 | 82.8 | 1.2 | smooth |

Emission spectrographic analysis of copper cathodes

| Test ID | Impurity Content (ppm) | | | | | | | | | | |
| --- | --- | --- | --- | --- | --- | --- | --- | --- | --- | --- | --- |
| | Se | Bi | Sb | As | Pb | S | Sn | Ni | Fe | Ag | Total |
| #142 | 0.2 | 0.2 | <1 | <1 | 0.3 | 10 | <1 | <1 | 1 | 1 | 12 |
| #143 | <0.2 | 0.4 | <1 | <1 | <0.1 | 9 | <1 | <1 | 1 | 1 | 12 |
| #144 | <0.2 | 0.5 | <1 | <1 | 0.3 | 9 | <1 | <1 | <1 | 1 | 11 |
| #149 | 0.4 | 0.1 | <1 | <1 | 0.9 | 8 | <1 | <1 | 1 | 1 | 10 |

-continued

| Test | Impurity Content (ppm) | | | | | | | | | | |
|---|---|---|---|---|---|---|---|---|---|---|---|
| ID | Se | Bi | Sb | As | Pb | S | Sn | Ni | Fe | Ag | Total |
| #150 | <0.2 | 0.1 | <1 | <1 | 0.3 | 9 | <1 | <1 | <1 | 1 | 10 |
| #151 | <0.2 | 0.1 | <1 | <1 | 0.3 | 9 | <1 | <1 | <1 | 1 | 11 |
| #146 | 0.3 | 0.1 | <1 | <1 | 0.9 | 10 | <1 | <1 | 1 | 1 | 13 |
| #147 | 0.2 | 0.1 | <1 | <1 | 0.4 | 10 | <1 | <1 | <1 | 1 | 12 |
| #148 | <0.2 | 0.2 | <1 | <1 | 0.1 | 9 | <1 | 1 | <1 | 1 | 11 |
| #152 | <0.2 | 0.7 | <1 | <1 | 0.1 | 10 | <1 | <1 | <1 | 1 | 12 |
| Limits | 2.0 | 1.0 | 4 | 5 | 5 | 15 | 5 | 10 | 10 | 25 | / |

Findings:
1. The three impurities, Sb, As, and Bi do not have any significant effect on the cell voltage current efficiency and cathode surface morphology.

EXAMPLE 6

Effect of Electrolyte Circulation in Electrowinning Cell

Mode: Batchwise 1-stage leaching and 1-stage electrowinning

Electrolyte: 35 g/L $Cu^{2+}$, 35 g/L $Fe_{(total)}$, 110 g/L $H_2SO_4$, 75 ppm $Cl^-$, glue and/or thiourea Conditions: 80° C.; redox potential=0.425 volt vs. SCE; 6 hour duration; 120 grams of high-grade copper-matte (−325 mesh); and for each test glue added at 5.5 lb/tonne started with 17 ppm; thiourea added at 0.37 lb/tonne started with 1.7 ppm; 970 $A/m^2$ c.d. for cathode and anode; electrode dimension: 2"×4"; ⅛" thick type 316 stainless steel (1/16" recessed); ¼" thick Eltech ALE anode; 1" space center to center to center between anode and cathode.

| Test | Flowrate | | Avg. $V_{cell}$ | CE | EC (kwh/ | |
|---|---|---|---|---|---|---|
| ID | GPM | cm/sec | (volt) | (%) | kg-Cu) | Cathode |
| #131 | 7 | 8.3 | 1.06 | 79.7 | 1.1 | smooth |
| #132 | 6 | 7.1 | 1.10 | 84.1 | 1.1 | smooth |
| #133 | 5 | 5.9 | 1.09 | 85.3 | 1.1 | smooth |
| #134 | 4 | 4.7 | 1.09 | 88.5 | 1.1 | smooth |
| #135 | 3 | 3.6 | 1.21 | 89.7 | 1.1 | smooth |
| #136 | 2 | 2.4 | 1.68 | 92.6 | 1.5 | rough cathode, $O_2$ evolved an anode |

Findings:
1. The current efficiency always increases with decreasing electrolyte circulation in the electrowinning cell.

2. The slowest flowrate which can still ensure a good coherent, relatively smooth cathode without preferential dendrite growth is approximately 3.6 era/sec.

EXAMPLE 7

Thick Copper Cathodes (48-hour Tests)

Mode: Continuous 3-stage leaching and 1-stage electrowinning

Electrolyte: 35 g/L $Cu^{2+}$, 35 g/L $Fe_{(total)}$, 110 g/L $H_2SO_4$, 75 ppm $Cl^-$, glue and/or thiourea and/or guar Conditions: 80° C.; redox potential=0.425 volt vs. SCE; 48 hour duration; 250 grams of high-grade copper-matte (−325 mesh) in each 1.6-L leach reactor: L1, L2, and L3; 970 $A/m^2$ c.d. for cathode and anode; electrode dimension: 2"×4"; ⅛" thick type 316 stainless steel (recessed: 5/16" left & right, ¼" top & bottom); ¼" thick Eltech ALE anode; 1" space center to center between anode and cathode.

| Test | Redox vs. | Flowrate | Additives (ppm/lb per tonne) | | | Avg. $V_{cell}$ | CE | EC (kwg/ |
|---|---|---|---|---|---|---|---|---|
| ID | SCE (V) | (cm/sec) | Glue | Thiourea | Guar | (V) | (%) | kg-Cu) |
| #158 | 0.425 | 8.31 | 17/5.5 | 0 | 0 | 1.03 | 73.3 | 1.18 |
| #159 | 0.425 | 5 | 17/5.5 | 1.7/0.37 | 0 | 1.09 | 83.3 | 1.10 |
| #160 | 0.425 | 4 | 17/5.5 | 1.7/0.37 | 0 | 1.20 | 87.8 | 1.15 |
| #161 | 0.441 | 4.5 | 17/5.5 | 1.7/0.37 | 0 | 1.24 | 77.2 | 1.36 |
| #162 | 0.425 | 5 | 0 | 0 | 1.6/1.2 | 1.07 | 79.4 | 1.13 |
| #163 | 0.425 | 5 | 17/5.5 | 0.6/0.12 | 1/0.8 | 1.22 | 82.1 | 1.25 |

Analyses of copper-matte leach residues

| Test ID | Sample ID | Calculated Copper Recovery | Cu (%) | Fe (%) | $S_{elemental}$ (%) | $S_{total}$ (%) |
|---|---|---|---|---|---|---|
| #120 | #120-L1 | 97 | 9.74 | 0.05 | 80.4 | 86.8 |
|  | #120-Acc. | 95 | 13.8 | 0.06 | 75.2 | 83.3 |
|  | #120-L2 | 61 | 55.9 | 0.04 | 16.8 | 42.3 |
|  | #120-L3 | 30 | 69.2 | 0.04 | <0.01 | 29.4 |
| #161 | #161-L1 | 96 | 12.1 | 0.08 | 80.2 | 86.1 |
|  | #161-Acc. | 96 | 11.5 | 0.07 | 81.1 | 86.7 |
|  | #161-L2 | 90 | 23.7 | 0.09 | 64.8 | 76.0 |
|  | #161-L3 | 33 | 68.3 | 0.08 | 0.70 | 31.5 |

Findings:
1. Over 95% copper recovery can be achieved easily

Note:
1. Acc. represents accumulated (or mixed) leach residues which were collected in a period of 48 hours.

EXAMPLE 8

Eltech ALE Anode (48-hour Tests)

Mode: Continuous 3-stage leaching and 1-stage electrowinning

Electrolyte: 35 g/L $Cu^{2+}$, 35 g/L $Fe_{(total)}$, 110 g/L $H_2SO_4$, 75 ppm $Cl^-$, glue and/or thiourea Conditions: 80° C.; redox potential=0.425 volt vs. SCE; 48 hour duration 250 grams of high-grade copper-matte (−325 mesh) in each 1.6-L leach reactor; 970 $A/m^2$ c.d. for cathode and anode; electrode dimension: 2"×4"; glue added at 5.5 lb/tonne started with 17 ppm; thiourea added at 0.37 lb/tonne started at 1.7 ppm; EW electrolyte circulation 7 GPM (8.3 cm/sec); 1" space center to center between anode and cathode.

| Test ID | Cathode substrate | Anode | Avg. $V_{cell}$ (Volt) | CE (%) | EC (kwh/lb-Cu) |
|---|---|---|---|---|---|
| #120 | ⅛" thick titanium | 3/16" thick Pb—Ca—Sn—Cu anode | 1.94 | 74.3 | 2.20 |
| #156 | ⅛" thick type 316 stainless | ¼" thick Eltech ALE anode | 1.11 | 74.6 | 1.26 |

Findings:

1. Eltech ALE anode provides approximately 42% energy savings compared with Pb-Ca-Sn-Cu anodes which are used in industry.

In summary, according to the present invention, an $SO_2$-free process for extraction of copper is provided. The process produces copper, in either a batchwise or continuous system, from copper-matte in_an acidic sulfate medium via leaching and electrowinning methods. Prior to leaching, copper-matte is ground to a particle size less than 325 mesh. Thereafter, copper-matte is subjected to leaching by ferric sulfate in an acidic solution containing cupric and ferrous sulfates under atmospheric pressure and at a temperature less than the boiling point. Over 95% of copper originally present in copper-matte may dissolve into solution during leaching. The leach residue may contain incompletely reacted copper-matte (less than 5%), elemental sulfur, PGM metals, gold and silver, and other insoluble impurities. Incompletely reacted copper-matte, elemental sulfur, PGM metals, gold and silver in the leach residue can all be fully recovered. Subsequent to solid-liquid separation after leaching, pregnant solution is pumped to a diaphragm less, forced flow electrowinning cell where high quality copper cathodes are produced at a current density 3 to 4 times as high as that used in conventional copper electrowinning, and at the same time ferric iron is regenerated from the oxidation of ferrous iron occurring on the anode. Despite electrowinning current density being 3 to 7 times as high as that in conventional copper electrowinning, the cathode copper deposit is coherent and meets market ASTM Standard B115-93 specifications for grade-1 copper cathode. There is no oxygen evolution on the anode, and electrowinning energy consumption is less than or equal to that in conventional copper electrowinning, i.e, on the order of 1.2 kwh/kg. Spent electrolyte from electrowinning is returned to the leaching circuit.

In the foregoing specification, the present invention has been described with respect to specific embodiments. These serve as examples to illustrate the invention rather than limit its scope. Modifications may be made without departing from the broader teachings and scope of the invention.

We claim:

1. A process for production of high purity metallic copper from copper-matte comprising the steps of:

leaching copper-matte under oxidizing conditions in a ferric ion containing acid copper sulfate electrolyte leach assembly, including one or more leach reactors, to solubilize copper into a leach solution forming a copper-rich leach solution and a residue containing elemental sulfur; and electrowinning copper from the copper-rich leach solution and regenerating ferric ions in an electrowinning cell assembly, including one or more electrowinning cells;

wherein the electrowinning cell assembly is physically decoupled from the leach assembly.

2. The process of claim 1 wherein the steps are carried out at atmospheric pressure.

3. The process of claim 1 wherein said steps are carried out at temperatures in the range of 40° C. to the boiling point.

4. The process of claim 1 wherein the leaching is achieved by chemical attack of ferric ions.

5. The process of claim 1 wherein the step of leaching copper-matte is carried out under counter current flow of the copper matte and the leach solution.

6. The process of claim 1 wherein the electrowinning takes place in one or more electrowinning cells which do not contain a diaphragm.

7. The process of claim 1 wherein the current density in the electrowinning cell assembly is in the range of 500 to 2000 $A/m^2$.

8. The process of claim 1 wherein the recirculation linear velocity of the electrolyte is in the range of 2 to 30 cm/sec.

9. The process of claim 1 wherein one or more of glue, thiourea, guar, and chloride are added to the electrowinning assembly.

10. The process of claim 1 wherein chloride is added to the leach tank assembly.

11. The process of claim 1 wherein the one or more electrowinning cells contain an Activated Lead Electrode anode.

12. The process of claim 1 wherein the copper matte is a high grade matte containing at least 60% Cu.

13. A process for the continuous production of high purity metallic copper from copper-matte comprising the steps of:

preparing a finely divided copper-matte;

leaching the copper-matte under oxidizing conditions in a ferric ion containing acid copper sulfate electrolyte leach assembly, including one or more leach reactors, to solubilize copper into a leach solution forming a copper-rich leach solution and a residue containing elemental sulfur;

separating the copper-rich leach solution from the residue;

electrowinning copper from the copper-rich leach solution and regenerating ferric ions in an electrowinning assembly including one or more electrowinning cells, wherein the electrowinning cell assembly is physically decoupled from the leach tank assembly;

recovering from the electrowinning assembly an electrolyte rich in ferric ions;

recovering elemental sulfur from the leach residue; and recovering precious metals from the leach residue.

14. The process of claim 13 wherein the leaching and the electrowinning steps are carried out at atmospheric pressure.

15. The process of claim 13 wherein the leaching and the electrowinning steps are carried out at temperatures in the range of 40° C. to the boiling point.

16. The process of claim 13 wherein the leaching is achieved by chemical attack of ferric ions.

17. The process of claim 13 wherein the step of leaching copper-matte is carried out under counter current flow of the copper matte and the leach solution.

18. process of claim 13 further comprising the steps of withdrawing a stream from the electrolyte rich in ferric ions and removing impurities from the stream, creating a purified electrolyte.

19. The process of claim 18 further comprising the step of transferring the purified electrolyte back to the electrowinning cell assembly.

20. The process of claim 18 wherein the impurities are removed through a process of solvent extraction.

21. The process of claim 18 wherein the impurities are removed through a process of ion-exchange.

22. The process of claim 18 wherein the removed impurities are one or more of As, Bi, and Sb.

23. The process of claim 13 wherein the electrowinning takes place in one or more electrowinning cells which do not contain a diaphragm.

24. The process of claim 13 wherein the current density in the electrowinning cell assembly is in the range of 500 to 2000 A/m$^2$.

25. The process of claim 13 wherein the recirculation linear velocity of the electrolyte is in the range of 2 to 30 cm/sec.

26. The process of claim 13 wherein one or more of glue, thiourea, and chloride is added to the electrowinning assembly.

27. The process of claim 13 wherein chloride is added to the leach tank assembly.

28. The process of claim 13 wherein the copper matte is a high grade matte containing at least 60% Cu.

* * * * *